United States Patent

Suresh et al.

[11] Patent Number: 5,204,079
[45] Date of Patent: Apr. 20, 1993

[54] HCN BY CATALYTIC AMMOXIDATION OF CRUDE ACETONITRILE

[75] Inventors: Dev D. Suresh, Hudson, Ohio; Mark C. Cesa, South Euclid, Ohio; Tai C. Yang, Maple Heights, Ohio; Robert K. Grasselli, Chadds Ford, Pa.; Mark R. Bruce, Seven Hills, Ohio; Michael J. Seely, Twinsburg, Ohio; Maria S. Friedrich, Lyndhurst, Ohio; Robert A. Dubbert, Solon, Ohio

[73] Assignee: Standard Oil Company, Cleveland, Ohio

[21] Appl. No.: 656,543

[22] Filed: Feb. 15, 1991

[51] Int. Cl.$^5$ ................................. C01C 3/02
[52] U.S. Cl. ..................................... 423/376
[58] Field of Search ........................... 423/376

[56] References Cited

U.S. PATENT DOCUMENTS

| 3,516,789 | 6/1970 | Sennewald et al. | 23/151 |
| 4,485,079 | 11/1984 | Brazdil et al. | 423/376 |
| 4,981,670 | 1/1991 | Dio et al. | 423/376 |

FOREIGN PATENT DOCUMENTS

| 623100 | 2/1963 | Belgium . |
| 1146861 | 4/1963 | Fed. Rep. of Germany . |
| 2366002 | 6/1977 | Fed. Rep. of Germany . |

*Primary Examiner*—Wayne Langel
*Attorney, Agent, or Firm*—M. F. Esposito; L. W. Evans

[57] ABSTRACT

A process of producing hydrogen cyanide from crude acetonitrile comprising contacting the crude acetonitrile with an ammoxidation catalyst at an elevated temperature in the presence of an oxygen containing gas and ammonia. Preferably, the process is performed in the absence of propylene.

17 Claims, No Drawings

HCN BY CATALYTIC AMMOXIDATION OF CRUDE ACETONITRILE

RELATED APPLICATIONS

This application is related to commonly assigned patent applications U.S. Ser. No. 233,744 filed Feb. 12, 1981, now abandoned, which is a continuation of Ser. No. 084,282 filed Oct. 12, 1979, now abandoned, which is a continuation of Ser. No. 916,452 filed Jun. 17, 1978, now abandoned.

BACKGROUND OF THE INVENTION

The present invention relates to a process for the preparation of hydrogen cyanide from crude acetonitrile. In particular, the present invention is directed to a process for the preparation of hydrogen cyanide from crude acetonitrile obtained as a coproduct during the manufacture of acrylonitrile by the Sohio Acrylonitrile Process.

Hydrogen cyanide is an important substance which is frequently employed as a starting material for various organic reactions. Its consumption is expected to increase in the future.

Currently, hydrogen cyanide has been manufactured mainly by the direct ammoxidation of methane (the Andrussow Process) and as a direct by-product of the ammoxidation of propylene to acrylonitrile (Sohio Acrylonitrile Process). In addition, various patents disclose descriptions of other processes for converting acetonitrile to HCN.

For example, U.S. Pat. No. 3,516,789 discloses a process for the manufacture of hydrogen cyanide by reacting acetonitrile free of HCN over an ammoxidation catalyst. The preferred procedure of this patent is a reaction of acetonitrile produced during the manufacture of acrylonitrile by recycling the acetonitrile which is free of HCN through the ammoxidation reactor over the ammoxidation catalyst. U.S. Pat. No. 3,911,089 discloses the preparation of hydrogen cyanide by addition of methanol to the ammoxidation reactor used during the production of acrylonitrile to further increase the yield of hydrogen cyanide. West German Patent 1,146,861 assigned to Bayer discloses hydrogen cyanide produced by the reaction of acetonitrile with molecular oxygen over an ammoxidation catalyst. This patent discloses that the yield of hydrogen cyanide is improved by the presence of ammonia. The processes disclosed in each of these patents have several disadvantages which are overcome by the process of the present invention.

SUMMARY OF THE INVENTION

It is the primary object of the present invention to provide an economical process for the production of hydrogen cyanide from crude acetonitrile.

It is a further object of the present invention to provide a process for the production of hydrogen cyanide from crude acetonitrile obtained as a coproduct from an acrylonitrile plant.

The term "crude acetonitrile" as used in this application means liquid acetonitrile containing hydrogen cyanide, other impurities and water. For example, crude acetonitrile produced as a co-product from the Sohio Acrylonitrile Process in addition to containing acetonitrile contains water, hydrogen cyanide, acrylonitrile, acetaldehyde, acetone, methanol, acrolein, oxazole, etc. The relative proportions of the components of the crude acetonitrile can vary over a wide range depending on various conditions. Usually no single component of impurities other than water found in crude acetonitrile is present in greater than 2 to 4 weight percent concentration.

Additional objects and advantages of the invention will be set forth in part in the description that follows and in part will be obvious from the description or may be learned by practicing the invention. The objects and advantages of the invention may be realized and obtained by means of the instrumentalities in combinations particularly pointed out in the appending claims.

To achieve the foregoing objects and in accordance with the purposes of the invention as embodied and broadly described herein, the process of the present invention comprises manufacturing hydrogen cyanide from crude acetonitrile comprising contacting the crude acetonitrile with an ammoxidation catalyst at an elevated temperature in the presence of an oxygen containing gas and ammonia to produce HCN.

In a preferred embodiment of the present invention the crude acetonitrile contacts the ammoxidation catalyst in the vapor state in the presence of a gaseous mixture containing an oxygen containing gas and ammonia, said gaseous mixture being free of any olefin such as propylene. Most preferably, the gaseous mixture consists of ammonia and an oxygen containing gas.

In a further preferred embodiment of the process of the present invention, a process of producing hydrogen cyanide comprises catalytically reacting in the vapor state propylene, ammonia and air over an ammoxidation catalyst to produce acrylonitrile and crude acetonitrile, separating the crude acetonitrile from the acrylonitrile, feeding the crude acetonitrile directly to a reactor containing an ammoxidation catalyst and contacting the crude acetonitrile with the ammoxidation catalyst in the presence of air and ammonia to produce hydrogen cyanide. Preferably, the gaseous mixture does not contain propylene.

The process of the present invention is an economically and environmentally attractive means for producing additional quantities of hydrogen cyanide over and above quantities produced directly from catalytic ammoxidation of propylene to acrylonitrile on a commercial scale (the Sohio Acrylonitrile Process). The Sohio Acrylonitrile Process, in addition to producing acrylonitrile and HCN, also produces as a by-product crude acetonitrile. Typically, the crude acetonitrile by-product stream is burned to recoup fuel value by most acrylonitrile producers. The use of the crude acetonitrile stream to produce highly valued HCN product is a distinct improvement in efficiency and environmental compatibility of the Sohio Acrylonitrile Process.

The unexpected advantages of the process of the present invention are that (1) catalytic ammoxidation of crude acetonitrile produces hydrogen cyanide of extremely good quality; and (2) a comparison of the selectivity increase obtained on ammoxidation of crude acetonitrile versus oxidation of crude acetonitrile with the selectivity increase obtained on ammoxidation of pure acetonitrile or aqueous acetonitrile versus oxidation of pure acetonitrile or aqueous acetonitrile shows an unexpected selectivity increase utilizing crude acetonitrile. Therefore, the selectivity increases obtained with crude acetonitrile are not primarily due to the presence of water in crude acetonitrile, and in most cases the presence of water results in only a very small selectivity increase at best. The use of crude acetonitrile as the starting material would be expected to produce hydrogen cyanide at lower selectivity levels. Moreover, the process of the present invention utilizing the crude acetonitrile in the ammoxidation reaction results in a much purer product than would be expected based on the composition of the original crude acetonitrile. Finally, the unexpected removal of substantially all of the organic contaminants during the ammoxidation of the crude acetonitrile to HCN makes recovery and purification of the hydrogen cyanide product easily accomplished by reintroduction of the HCN into the recovery and purification section of the commercial acrylonitrile plant.

DETAILED DESCRIPTION OF THE INVENTION

Reference will now be made in detail to the present preferred embodiments of the invention.

While the invention will now be described in connection with the preferred embodiments, it will be understood that it is not intended to limit the invention to those embodiments. On the contrary, it is intended to cover all alternatives, modifications and equivalents as may be include within the scope of the invention defined by the appending claims. The process of the present invention is directed to the production of hydrogen cyanide from crude acetonitrile. In particular, the process comprises catalytically reacting crude acetonitrile at an elevated temperature over an ammoxidation catalyst in the presence of an oxygen containing gas and ammonia to produce hydrogen cyanide. Preferably, the gaseous mixture does not contain propylene.

The crude acetonitrile can be obtained from any conventional source. However, in the preferred embodiment of the present invention the crude acetonitrile is obtained as a by-product produced during the practice of the Sohio Acrylonitrile Process and comprises acetonitrile/water azeotrope containing various organic impurities which include HCN. The concentration level of the organic impurities in the crude acetonitrile is usually less than 15 weight percent with no single organic component found in greater than 2 to 4 weight percent concentration. Usually, the acetonitrile/water azeotrope obtained from the acrylonitrile plant contains between 25 and 85 percent acetonitrile.

It is important to note that pretreatment of the crude acetonitrile is not essential to the practice of the process of the present invention. Therefore, pretreatment of the crude acetonitrile with a polymerization inhibiting agent such as those disclosed in U.S. Ser. No. 451,477 filed Dec. 15, 1989 and assigned to assignee of the present application is not necessary for the practice of the present invention

STARTING MATERIALS

Ammonia may be supplied to the reaction zone either as a pure vapor or as a mixture with water (ammonium hydroxide solution) or other inert solvent.

Oxygen may be supplied to the reaction zone either in pure form, as air, or in mixtures with inert gases such as nitrogen, helium, argon, and the like.

Water in the form of steam may also be optionally added to the reaction mixture.

CATALYSTS

Any catalyst active for conversion of pure acetonitrile to HCN via oxidation or ammoxidation is within the scope of this invention. Typical of the types of catalysts which may be utilized in the practice of the process of the present invention are catalysts which can be found in U.S. Pat. No. 3,642,930; 3,911,089; 4,228,098 and 3,516,789 herein incorporated by reference.

REACTION CONDITIONS

The reaction may be carried out in the liquid phase or in the vapor phase in either a static system or a flow system. Vapor-phase flow reaction systems are preferred, with either fixed-bed or fluid-bed catalysts with a fluid bed catalysts being preferred. Reaction temperatures are within the range of about 300° C. to about 550° C., preferably 325° to 500° C., especially preferred being 375° to 470° C. Pressures are within the range of about 0.1 to 10 atmospheres absolute. The mixture of crude acetonitrile, ammonia, and oxygen (or air) is allowed to remain in contact with the catalyst for between about 0.05 second to 50 seconds, preferably about 0.1 to 20 seconds.

The molar ratios of the reaction components can vary within wide limits. For example, 0.01 to 10 moles ammonia and 0.01 to 40 moles oxygen may be used per mole of acetonitrile in the crude acetonitrile feed. Preferred mole ratio ranges of ammonia and oxygen are 0.1 to 3.0 per mole of acetonitrile and 0.5 to 10 per mole of acetonitrile, respectively.

In a preferred embodiment of the invention, the crude acetonitrile starting material, obtained as a distillate fraction of the propylene ammoxidation process, is converted to HCN in a separate reactor system, and the reactor effluent is fed directly to the propylene ammoxidation quench reactor and the effluent then fed to the propylene ammoxidation absorber column. In this manner the propylene ammoxidation recovery and purification system can be used to recover and purify the incremental HCN produced by the ammoxidation of crude acetonitrile. Any unreacted acetonitrile can be recycled to the ammoxidation reactor via the propylene ammoxidation recovery and purification process.

The following examples are set forth below only for purposes of illustration.

EXAMPLE 1

A 5 cc volume upward flow stainless steel microreactor (8 mm i.d.) was charged with 2.09 g (2 mL) of a BiMoFeOx promoted catalyst, and the reactor was heated to 425° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 50.5 weight percent $CH_3CN$, 43.4 weight percent $H_2O$, 0.36 weight percent HCN, and 5.8 weight percent other organics as described above. The molar proportions of the feed were 1 $CH_3CN$/0.25 $NH_3$/1.7 $O_2$/6.3 $N_2$ with a contact time of 3.04 sec. Reactants were fed for 30 minutes. The reactor effluent was collected in a scrubber containing 0.5N aqueous HCl. Analysis of the reactor effluent showed 62.5% conversion of $CH_3CN$ and 66.9% selectivity to HCN (100% selectivity=2 moles HCN/mole $CH_3CN$ reacted). Gas chromatographic analysis of the reactor off-gas showed the presence of CO and $CO_2$ in amounts which account for the remainder of the converted $CH_3CN$. Inspection of the gas chromatographic trace of the reactor effluent scrubber solution showed essentially complete conversion of the other organic components of the crude acetonitrile feed.

EXAMPLE 2

This experiment was carried out as described in Example 1 with the exception that the NH₃ was omitted. Conversion of CH₃CN was 58.4% and selectivity to HCN was 45.3%.

The increase in selectivity on ammoxidation of crude acetonitrile vs. oxidation of crude acetonitrile was 21.6%.

EXAMPLE 3

The experiment was carried out as described in Example 1 with the exception that pure acetonitrile was used as feed instead of crude acetonitrile. Conversion of acetonitrile was 74.1% and selectivity to HCN was 53.8%.

EXAMPLE 4

The experiment was carried out as described in Example 3 with the exception that the NH₃ was omitted. Conversion of CH₃CN was 67.4% and selectivity of HCN was 39.7%.

The increase in selectivity on ammoxidation of pure acetonitrile vs. oxidation of pure acetonitrile was 14.1%. A comparison of the results of Examples 1 and 2 with the results obtained in Examples 3 and 4 demonstrates that the selectivity increase on ammoxidation of crude acetonitrile vs. oxidation of crude acetonitrile is substantially greater than the selectivity increase on ammoxidation of pure acetonitrile vs. oxidation of pure acetonitrile.

EXAMPLE 5

The experiment was carried out as described in Example 1 with the exception that a 54 weight percent acetonitrile-46 weight percent water mixture was used as feed instead of crude acetonitrile. This acetonitrile-water mixture was chosen to represent the relative proportions of acetonitrile and water found in the crude acetonitrile used in Examples 1 and 2. Conversion of acetonitrile was 39.2% and selectivity to HCN was 55.6%.

EXAMPLE 6

The experiment was carried out as described in Example 5 with the exception that the NH₃ was omitted. Conversion of CH₃CN was 40.0% and selectivity to HCN was 36.7%.

The increase in selectivity on ammoxidation of aqueous acetonitrile versus oxidation of aqueous acetonitrile was 18.9%.

A comparison of the results of Examples 1 and 2 with the results obtained in Examples 5 and 6 demonstrates that the selectivity increase on ammoxidation of crude acetonitrile versus oxidation of crude acetonitrile is substantially greater than the selectivity increase on ammoxidation of aqueous acetonitrile versus oxidation of aqueous acetonitrile.

The following Examples 7 to 24, similar to Examples 1 to 6, were performed for purposes of further demonstrating the process of the present invention and its unexpected results: Examples 7 to 12 were run with a BiMoFeOx catalyst having a different composition from the catalyst utilized in Examples 1 to 6. Examples 13 to 18 utilized a BiMoFeOx catalyst having a different composition from the catalysts utilized in Examples 1 to 12. Finally, Examples 19 to 24 utilized a BiMoFeOx catalyst having a different composition from the catalysts utilized in Examples 1 to 18.

Examples 7 to 24, the results of which are set forth below in Table I, again demonstrate the unexpected selectivity increase obtained during ammoxidation of crude acetonitrile vs. oxidation of crude acetonitrile compared with ammoxidation of pure acetonitrile or aqueous acetonitrile vs. oxidation of pure acetonitrile or aqueous acetonitrile. In addition, the examples show that this increase is not due to the presence of H₂O in the crude acetonitrile.

For example, the selectivity increase obtained by ammoxidation of pure acetonitrile (Example 14) vs. oxidation of pure acetonitrile (Example 13) was 18.8%; and the selectivity increase obtained by ammoxidation of aqueous acetonitrile with the same catalyst (Example 16) vs. oxidation of aqueous acetonitrile (Example 15) was 19.1%. The selectivity increase obtained when crude acetonitrile was substituted (Examples 17 and 18) was 35.7%. Accordingly, ammoxidation of crude acetonitrile unexpectedly improved selectivity compared with pure acetonitrile by 16.9% and compared with aqueous acetonitrile by 16.6%. Moreover, this improvement was not obtained at the expense of product quality. The results of Examples 7 to 24 utilizing various catalyst compositions provides further evidence that the results obtained are not dependent on the specific catalyst used.

TABLE I

Reaction Conditions: 425° C.
Contact Time = 3 sec.
2 mL catalyst
O₂:CH₃CN = 1.7:1
N₂:CH₃CN = 6.3:1

| Example | CH₃CN Source | NH₃/CH₃CN | CH₃CN % Conv. | HCN % Select. | Selectivity Increase On Ammoxidation, % |
|---|---|---|---|---|---|
| 7 | pure | 0 | 75.0 | 44.1 | |
| 8 | pure | 0.25 | 89.8 | 60.5 | 16.4 |
| 9 | aqueous* | 0 | 55.7 | 43.3 | |
| 10 | aqueous* | 0.25 | 53.2 | 56.4 | 13.1 |
| 11 | crude** | 0 | 58.0 | 44.4 | |
| 12 | crude** | 0.25 | 57.6 | 71.8 | 27.4 |
| 13 | pure | 0 | 55.6 | 23.8 | |
| 14 | pure | 0.25 | 48.1 | 52.6 | 18.8 |
| 15 | aqueous* | 0 | 32.9 | 26.2 | |
| 16 | aqueous* | 0.25 | 22.1 | 45.3 | 19.1 |
| 17 | crude** | 0 | 27.1 | 33.3 | |
| 18 | crude** | 0.25 | 24.0 | 69.0 | 35.7 |
| 19 | pure | 0 | 79.7 | 42.6 | |

TABLE I-continued

| 20 | pure | 0.25 | 77.0 | 53.9 | 11.3 |
| 21 | aqueous* | 0 | 49.3 | 38.6 | |
| 22 | aqueous* | 0.25 | 53.3 | 52.7 | 14.1 |
| 23 | crude** | 0 | 69.2 | 52.7 | |
| 24 | crude** | 0.25 | 62.0 | 74.7 | 22.0 |

*54 Weight Percent Acetonitrile, 46 Weight Percent Water
**Composition As Described In Example 1

Examples 25 to 35 set forth below further illustrate the process of the present invention.

EXAMPLE 25

A 5 cc volume upward flow stainless steel microreactor (8 mm i.d.) was charged with 2.0 g (2.0 mL) of a BiMoFeOx catalyst identical to that used in Examples 1 to 6, and the reactor was heated to 440° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 77.6 weight percent $CH_3CN$, 13.5 weight percent $H_2O$, 0.57 weight percent HCN, and 8.3 weight percent other organics as described above. The molar proportions of the feed were 1 $CH_3CN$/0.55 $NH_3$/1.64 $O_2$/5.73 $N_2$ with a contact time of 3.0 seconds. Reactants were fed for 30 minutes. The reactor effluent was collected in a scrubber containing 0.25M aqueous oxalic acid solution. Analysis of the reactor effluent showed 88.5% conversion of $CH_3CN$ and 65.7% selectivity to HCN. Gas chromatographic analysis of the reactor off-gas showed the presence of CO and $CO_2$ in amounts which account for the remainder of the converted $CH_3CN$.

EXAMPLE 26

A 5 cc volume upward flow stainless steel microreactor (8 mm i.d.) was charged with 2.0 g (2.0 mL) of a BiMoFeOx catalyst identical to that used in Examples 13 to 18, and the reactor was heated to 440° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 77.6 weight percent $CH_3CN$, 13.5 weight percent $H_2O$, 0.57 weight percent HCN, and 8.3 weight percent other organics as described above. The molar proportions of the feed were 1 $CH_3CN$/0.55 $NH_3$/1.64 $O_2$/5.73 $N_2$ with a contact time of 3.0 seconds. Reactants were fed for 30 minutes. The reactor effluent was collected in a scrubber containing 0.25M aqueous oxalic acid solution. Analysis of the reactor effluent showed 33.51% conversion of $CH_3CN$ and 65.65% selectivity to HCN. Gas chromatographic analysis of the reactor off-gas showed the presence of CO and $CO_2$ in amounts which account for the remainder of the converted $CH_3CN$.

EXAMPLE 27

A 5 cc volume upward flow stainless steel microreactor (8 mm i.d.) was charged with 2.1415 g (2.0 mL) of a BiMoFeOx catalyst identical to that used in Examples 1 to 6, and the reactor was heated to 455° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 49.54 weight percent $CH_3CN$, with the remainder $H_2O$, HCN, and other organics as described above. The molar proportions of the feed were 1 $CH_3CN$/0.25 $NH_3$/0.7 $O_2$/5.6 $N_2$ with a contact time of 3.05 seconds. Reactants were fed for 30 minutes. The reactor effluent was collected in a scrubber containing 0.5M aqueous HCl solution. Analysis of the reactor effluent showed 85.99% conversion of $CH_3CN$ and 58.74% selectivity to HCN. Gas chromatographic analysis of the reactor off-gas showed the presence of CO and $CO_2$ in amounts which account for the remainder of the converted $CH_3CN$.

EXAMPLE 28

A 5 cc volume upward flow stainless steel microreactor (8 mm i.d.) was charged with 4.5103 g (4.0 mL) of a BiMoFeOx catalyst identical to that used in Examples 1 to 6, and the reactor was heated to 425° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 49.54 weight percent $CH_3CN$, with the remainder $H_2O$, HCN, and other organics as described above. The molar proportions of the feed were 1 $CH_3CN$/0.25 $NH_3$/1.7 $O_2$/5.6 $N_2$ with a contact time of 6.10 seconds. Reactants were fed for 30 minutes. The reactor effluent was collected in a scrubber containing 0.5M aqueous HCl solution. Analysis of the reactor effluent showed 85.95% conversion of $CH_3CN$ and 53.29% selectivity to HCN. Gas chromatographic analysis of the reactor off-gas showed the presence of CO and $CO_2$ in amounts which account for the remainder of the converted $CH_3CN$.

EXAMPLE 29

A 5 cc volume upward flow stainless steel microreactor (8 mm i.d.) was charged with 4.2995 g (4.0 mL) of a BiMoFeOx catalyst identical to that used in Examples 7 to 12, and the reactor was heated to 425° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 49.54 weight percent $CH_3CN$, with the remainder $H_2O$, HCN and other organics as described above. The molar proportions of the feed were 1 $CH_3CN$/0.25 $NH_3$/1.7 $O_2$/5.6 $N_2$ with a contact time of 6.00 seconds. Reactants were fed for 30 minutes. The reactor effluent was collected in a scrubber containing 0.5M aqueous HCl solution. Analysis of the reactor effluent showed 79.43% conversion of $CH_3CN$ and 58.27% selectivity to HCN. Gas chromatographic analysis of the reactor off-gas showed the presence of CO and $CO_2$ in amounts which account for the remainder of the converted $CH_3CN$.

EXAMPLE 30

A 5 cc volume upward flow stainless steel microreactor (8 mm i.d.) was charged with 2.0262 g (2.0 mL) of a BiMoFeOx catalyst identical to that used in Examples 7 to 12, and the reactor was heated to 470° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 49.54 weight percent $CH_3CN$, with the remainder $H_2O$, HCN, and other organics as described above. The molar proportions of the feed were 1 $CH_3CN$/0.25 $NH_3$/1.7 $O_2$/5.6 $N_2$ with a contact time of 3.11 seconds. Reactants were fed for 30 minutes. The reactor effluent was collected in a scrubber containing 0.5M aqueous HCl solution. Analysis of the reactor effluent showed 88.17% conversion of $CH_3CN$ and 58.26% selectivity to HCN. Gas chromatographic analysis of the reactor off-gas showed the presence of CO and $CO_2$ in amounts which account for the remainder of the converted $CH_3CN$.

EXAMPLE 31

A 5 cc volume upward flow stainless steel microreactor (8 mm i.d.) was charged with 2.0733 g (2.0 mL) of a BiMoFeOx catalyst identical to that used in Examples 13 to 18, and the reactor was heated to 455° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 49.54 weight percent $CH_3CN$, with the remainder $H_2O$, HCN, and other organics as described above. The molar proportions of the feed were 1 $CH_3CN$/0.25 $NH_3$/1.7 $O_2$/5.6 $N_2$ with a contact time of 3.04 seconds. Reactants were fed for 30 minutes. The reactor effluent was collected in a scrubber containing 0.5M aqueous HCl solution. Analysis of the reactor effluent showed 51.04% conversion of $CH_3CN$ and 62.16% selectivity to HCN. Gas chromatographic analysis of the reactor off-gas showed the presence of CO and $CO_2$ in amounts which account for the remainder of the converted $CH_3CN$.

EXAMPLE 32

A 5 cc volume upward flow stainless steel microreactor (8 mm i.d.) was charged with 5.0293 g (4.0 mL) of a BiMoFeOx catalyst identical to that used in Examples 19 to 24, and the reactor was heated to 425° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 49.54 weight percent $CH_3CN$, with the remainder $H_2O$, HCN, and other organics as described above. The molar proportions of the feed were 1 $CH_3CN$/0.25 $NH_3$/1.7 $O_2$/5.6 $N_2$ with a contact time of 6.00 seconds. Reactants were fed for 30 minutes. The reactor effluent was collected in a scrubber containing 0.5M aqueous HCl solution. Analysis of the reactor effluent showed 90.95% conversion of $CH_3CN$ and 54.56% selectivity to HCN. Gas chromatographic analysis of the reactor off-gas showed the presence of CO and $CO_2$ in amounts which account for the remainder of the converted $CH_3CN$.

EXAMPLE 33

A 5 cc volume upward flow stainless steel microreactor (8 mm i.d.) was charged with 2.3673 g (2.0 mL) of a BiMoFeOx catalyst identical to that used in Examples 19 to 24, and the reactor was heated to 455° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 49.54 weight percent $CH_3CN$, with the remainder $H_2O$, HCN, and other organics as described above. The molar proportions of the feed were 1 $CH_3CN$/0.25 $NH_3$/1.7 $O_2$/5.6 $N_2$ with a contact time of 3.05 seconds. Reactants were fed for 30 minutes. The reactor effluent was collected in a scrubber containing 0.5M aqueous HCl solution. Analysis of the reactor effluent showed 87.29% conversion of $CH_3CN$ and 60.18% selectivity to HCN. Gas chromatographic analysis of the reactor off-gas showed the presence of CO and $CO_2$ in amounts which account for the remainder of the converted $CH_3CN$.

EXAMPLE 34

A 5 cc volume upward flow stainless steel microreactor (8 mm i.d.) was charged with 3.4209 g (2.0 mL) of 20-30 mesh particles of a SbSnFeOx catalyst, and the reactor was heated to 440° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 52.24 weight percent $CH_3CN$, 41.7 weight percent $H_2O$, and the remainder HCN and other organics as described above. The molar proportions of the feed were 1 $CH_3CN$/1 $NH_3$/1.73 $O_2$/4.56 $N_2$ with a contact time of 3.12 seconds. Reactants were fed for 30 minutes. The reactor effluent was collected in a scrubber containing 0.5M aqueous HCl solution. Analysis of the reactor effluent showed 35.69% conversion of $CH_3CN$ and 75.94% selectivity to HCN. Gas chromatographic analysis of the reactor off-gas showed the presence of CO and $CO_2$ in amounts which account for the remainder of the converted $CH_3CN$.

EXAMPLE 35

A 5 cc volume upward flow stainless steel microreactor (8 mm i.d.) was charged with 1.0805 g (1.0 mL) of a FeSbTeMoOx catalyst, and the reactor was heated to 420° C. over 30 minutes in a molten salt bath with a flow of helium through the catalyst bed. After this time a flow of crude acetonitrile, oxygen, nitrogen, and gaseous ammonia was introduced over the catalyst. The crude acetonitrile was fed using a syringe metering pump, and the gaseous feeds were metered with mass flow controllers. The composition of the crude acetonitrile was 75.78 weight percent $CH_3CN$, 18.38 weight percent $H_2O$, and the remainder HCN and other organics as described above. The molar proportions of the feed were 1 $CH_3CN$/1 $NH_3$/2.42 $O_2$/10.36 $N_2$ with a contact time of 1 second. Reactants were fed for 30 minutes. The reactor effluent was collected in a scrubber containing 0.5M aqueous HCl solution. Analysis of the reactor effluent showed 40.41% conversion of $CH_3CN$ and 65.43% selectivity to HCN. Gas chromatographic analysis of the reactor off-gas showed the presence of CO and $CO_2$ in amounts which account for the remainder of the converted $CH_3CN$.

The foregoing description of the preferred embodiments of the present invention have been presented for purposes of illustration and description. They are not intended to be exhaustive or to limit the invention to the precise form disclosed. It is intended that the scope of the invention be defined by the claims appended hereto.

What is claimed is:

1. A process for the production of hydrogen cyanide directly from crude acetonitrile containing hydrocyanic acid is an impurity comprising contacting in the vapor state crude acetonitrile at an elevated temperature with an ammoxidation catalyst in the presence of oxygen containing gas and ammonia to produce hydrogen cyanide.

2. The process of claim 1 wherein the oxygen containing gas is air.

3. The process of claim 1 wherein the process is performed at a temperature between about 300° and 550° C.

4. The process of claim 3 wherein the contact time of the crude acetonitrile with the catalyst is between 0.05 and 50 seconds.

5. The process of claim 4 wherein the mole ratio of ammonia to acetonitrile is about 0.1 to 3.0.

6. The process of claim 5 wherein the mole ratio of oxygen to acetonitrile is about 0.5 to 10.

7. The process of claim 1 wherein the process is performed in the absence of propylene.

8. The process of claim 1 wherein the process is performed at a temperature between 375° and 470° C.

9. The process of claim 8 wherein the mole ratio of $O_2$:$CH_3CN$ is 1.7:1.

10. The process of claim 9 wherein the mole ratio $NH_3$/$CH_3CN$ is equal to 0.25.

11. The process for the production of hydrogen cyanide directly from crude acetonitrile comprising catalytically reacting in the vapor state propylene, ammonia and air over an ammoxidation catalyst to produce acrylonitrile and crude acetonitrile, separating the acrylonitrile from the crude acetonitrile, feeding the crude acetonitrile to a reactor containing an ammoxidation catalyst and contacting the crude acetonitrile with the ammoxidation catalyst in the presence of air and ammonia to produce hydrogen cyanide.

12. The process of claim 11 wherein the oxygen containing gas is air.

13. The process of claim 11 wherein the reaction is performed at a temperature between about 300° and 550° C.

14. The process of claim 11 wherein the contact time of the crude acetonitrile with the catalyst is between 0.05 and 50 seconds 15. The process of claim 11 wherein the mole ratio of ammonia to acetonitrile is about 0.1 to 3.0.

16. The process of claim 11 wherein the mole ratio of oxygen to acetonitrile is about 0.5 to 10.

17. The process of claim 11 further comprising contacting the crude acetonitrile with the ammoxidation catalyst in the presence of air and ammonia in the absence of propylene to produce hydrogen cyanide.

* * * * *